(12) United States Patent
Luo et al.

(10) Patent No.: US 11,403,781 B2
(45) Date of Patent: Aug. 2, 2022

(54) METHODS AND SYSTEMS FOR INTRA-CAPTURE CAMERA CALIBRATION

(71) Applicant: Verizon Patent and Licensing Inc., Basking Ridge, NJ (US)

(72) Inventors: Liang Luo, Harrison, NJ (US); Elena Dotsenko, Princeton, NJ (US); Tom Hsi Hao Shang, Forest Hills, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 29 days.

(21) Appl. No.: 17/002,126

(22) Filed: Aug. 25, 2020

(65) Prior Publication Data

US 2022/0067967 A1 Mar. 3, 2022

(51) Int. Cl.
| | |
|---|---|
| *G06T 7/80* | (2017.01) |
| *G06T 7/73* | (2017.01) |
| *H04N 5/247* | (2006.01) |
| *H04N 17/00* | (2006.01) |
| *G06T 17/00* | (2006.01) |
| *G06V 10/98* | (2022.01) |
| *G06V 20/64* | (2022.01) |
| *G06V 40/10* | (2022.01) |
| *G06V 40/16* | (2022.01) |

(52) U.S. Cl.
CPC ............ *G06T 7/80* (2017.01); *G06T 7/74* (2017.01); *G06T 17/00* (2013.01); *G06V 10/98* (2022.01); *G06V 20/64* (2022.01); *G06V 40/10* (2022.01); *G06V 40/168* (2022.01); *H04N 5/247* (2013.01); *H04N 17/002* (2013.01); *G06T 2207/10016* (2013.01); *G06T 2207/20081* (2013.01); *G06T 2207/30201* (2013.01)

(58) Field of Classification Search
CPC .. G06T 7/80; G06T 7/74; G06T 17/00; G06T 2207/10016; G06T 2207/20081; G06T 2207/30201; G06K 9/00201; G06K 9/00268; G06K 9/00362; G06K 9/03; H04N 5/247; H04N 17/002
See application file for complete search history.

(56) References Cited

U.S. PATENT DOCUMENTS

| | | | |
|---|---|---|---|
| 2013/0188070 A1* | 7/2013 | Lee | G06K 9/00255 348/222.1 |
| 2021/0295559 A1* | 9/2021 | Huang | H04N 5/247 |

\* cited by examiner

*Primary Examiner* — Michael E Teitelbaum

(57) ABSTRACT

An illustrative image processing system identifies an object depicted in an image captured by a camera. The image processing system locates, within the image, a set of calibration points corresponding to features of the object. Based on the set of calibration points, the image processing system performs a calibration operation with respect to the camera. Additionally, the image processing system generates model data based on the image. The model data is representative of a model of the object depicted in the image. Corresponding methods and systems are also disclosed.

20 Claims, 9 Drawing Sheets

METHODS AND SYSTEMS FOR INTRA-CAPTURE CAMERA CALIBRATION

BACKGROUND INFORMATION

Cameras are used to capture still and/or video images that may be presented to viewers directly and/or may be further analyzed and processed for various purposes. As one example, three-dimensional (3D) models of objects may be generated based on images captured by cameras having multiple different vantage points around the objects. As another example, computer vision may be performed to extract information about objects captured in the images and to implement autonomous processes based on this information. These and various other applications of image processing may be used in a variety of entertainment, educational, industrial, commercial, vocational, promotional, and/or other applications and use cases (e.g., virtual reality use cases, augmented reality use cases, etc.).

Proper camera calibration with respect to the cameras capturing the images may be performed to facilitate optimal functionality of these image processing applications. For example, an accurate camera calibration may eliminate various types of performance and quality issues that might otherwise arise with cameras that are not well-calibrated.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
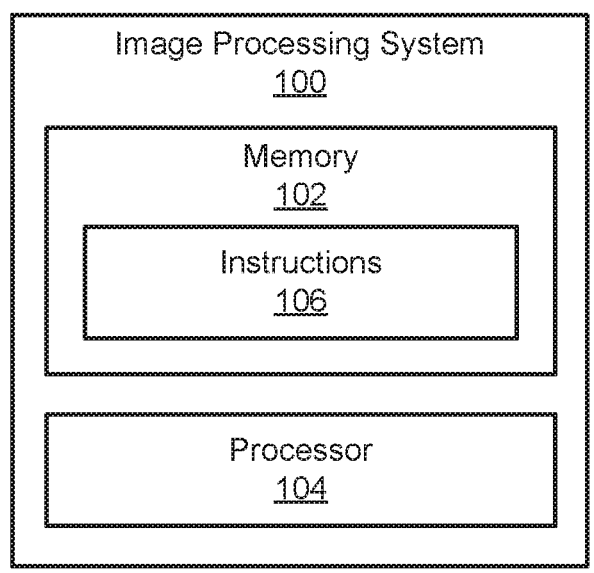
FIG. 1 shows an illustrative image processing system configured to perform intra-capture camera calibration according to embodiments described herein.

Methods and systems for intra-capture camera calibration are described herein. As mentioned above, camera calibration may be performed with respect to one or more cameras to facilitate optimal functionality of various image processing applications, to eliminate performance and quality issues, and so forth. For example, proper camera calibration may help mitigate or correct for lens distortion and/or other unwanted artifacts of image capture, may estimate scene and/or object geometries (e.g., to align a scene being captured by multiple cameras), and/or may otherwise facilitate optimal use of image data captured by the cameras for various applications (e.g., generating models, performing computer vision operations, etc.). In some examples, camera calibration may involve determining (e.g., estimating) intrinsic parameters of a camera's internal characteristics such as focal length, skew, distortion, image center, and so forth. Additionally or alternatively, camera calibration may involve determining extrinsic parameters associated with a camera's position and/or orientation in the world and/or with respect to other cameras. For instance, camera calibration may involve or be closely associated with scene alignment of a set of cameras to ensure that each camera shares a common world coordinate space and that the same features captured by different cameras are properly identified as the same features, and are aligned in the world coordinate space.

Conventionally, camera calibration is performed during a designated time period and involves dedicated objects that facilitate the camera calibration. For example, a conventional volumetric capture system will be considered that includes a set of cameras disposed at different locations surrounding a scene that includes one or more objects to be volumetrically modeled based on data captured from the different vantage points of the cameras. Before such a volumetric capture system begins normal operations (e.g., prior to modeling the target objects that are to be modeled), the volumetric capture system would typically undergo an offline calibration procedure. For instance, during this pre-capture time period, a dedicated calibration object may be placed and/or moved around within the scene to facilitate calibration in preparation for modeling procedures that are to be performed at a subsequent time.

A dedicated calibration object may include, for example, a chessboard object or another object featuring predefined and readily recognizable features (e.g., corners between black and white squares on the chessboard, etc.). The dedicated calibration object may be specifically designed and used for camera calibration purposes. Such calibration objects would only be present in the scene during the dedicated calibration stage, and would be removed prior to normal operation when other objects (e.g., people, props, etc.) are introduced into the scene and volumetrically modeled based on the camera calibration that has been performed.

Methods and systems for intra-capture camera calibration described herein provide significant benefits and improvements over this traditional camera calibration paradigm. For example, rather than relying on dedicated and specially-designed calibration objects (e.g., chessboards, QR codes, ArUco or ChArUco patterns, barcodes, etc.) to manage camera calibration, methods and systems described herein rely on ordinary objects (e.g., people, props, furniture, etc.) that are intended to be modeled or otherwise processed during normal operations to manage the camera calibration (e.g., to initialize the camera calibration, to revise the camera calibration, etc.). As will be described in more detail below, for instance, a wealth of information available about the human body and various poses the body can take (e.g., information studied by scientists and artists for decades, and more recently gathered and organized using machine learning and other advanced technologies for a variety of applications) may enable a properly processed image depicting the human body suitable for use in camera calibration instead of or in addition to images depicting dedicated calibration objects.

Another advantage of methods and systems described herein is that, as a result of being able to leverage images of ordinary objects for camera calibration (i.e., initializing, revising, and/or maintaining camera calibration parameters), calibration operations may be performed in an intra-capture manner. Specifically, rather than being performed during a dedicated calibration stage prior to normal operation, intra-capture camera calibration may be performed during normal operation of a system (e.g., as a volumetric capture system captures imagery depicting ordinary objects to be modeled, as volumetric models of various objects including the object used for calibration are generated and maintained, etc.). In this manner, camera calibration may be initialized without the inconvenience of a dedicated calibration session. Moreover, as events occur during operation that may affect the calibration of the cameras (e.g., if cameras are moved or accidentally bumped so as to change position, if the lighting of the scene changes, if objects move to areas of the scene for which the camera calibration has not yet been optimized, thermal changes in the environment affecting cameras, etc.), methods and systems described herein for intra-capture camera calibration may automatically and immediately respond to these events by fixing, updating, improving, and/or otherwise continuing to manage the camera calibration without needing to put scene capture or modeling on hold to return to the dedicated calibration stage.

Another advantage of implementing intra-capture camera calibration methods and systems described herein is that leveraging ordinary objects rather than dedicated calibration objects may lead to more and better opportunities for cameras to be calibrated and aligned with respect to global and more localized dimensions. For example, as an animated and non-rigid three-dimensional (3D) object such as a human body moves about a scene, various intrinsic and extrinsic parameters for various cameras may be initialized and continuously refined. In this way, not only can highly accurate global calibration parameters be determined, but local calibration parameters may be continuously fine-tuned to further improve the camera calibration for each of the cameras capturing the scene. By relying on higher dimensional data (e.g., rather than single pixel data such as presented with a dedicated chessboard object or the like), systems may derive more information about the world coordinate space and may thereby enhance the scene alignment aspects of the camera calibration. Moreover, certain issues that commonly arise with dedicated calibration objects (e.g., lighting issues related to glare obscuring a chessboard pattern of a dedicated calibration object, etc.) may naturally be resolved when 3D objects such as human bodies or other ordinary objects in the scene are used for camera calibration.

Various specific embodiments will now be described in detail with reference to the figures. It will be understood that the specific embodiments described below are provided as non-limiting examples of how various novel and inventive principles may be applied in various situations. Additionally, it will be understood that other examples not explicitly described herein may also be captured by the scope of the claims set forth below. Methods and systems for intra-capture camera calibration described herein may provide any of the benefits mentioned above, as well as various additional and/or alternative benefits that will be described and/or made apparent below.

FIG. 1 shows an illustrative image processing system 100 configured to perform intra-capture camera calibration according to principles described herein. System 100 may be implemented by computer resources such as servers, processors, memory devices, storage devices, communication interfaces, and so forth. For example, system 100 may be implemented by computing systems such as local computing systems operated by a user, distributed computing systems operated by a communications provider (e.g., multi-access edge computing (MEC) servers), distributed computing systems operated by a cloud-computing provider (e.g., multi-access cloud servers), or any other suitable computing system or systems.

As shown, system 100 may include, without limitation, a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with intra-capture camera calibration as described herein and/or as may serve a particular implementation.

Figure 2:
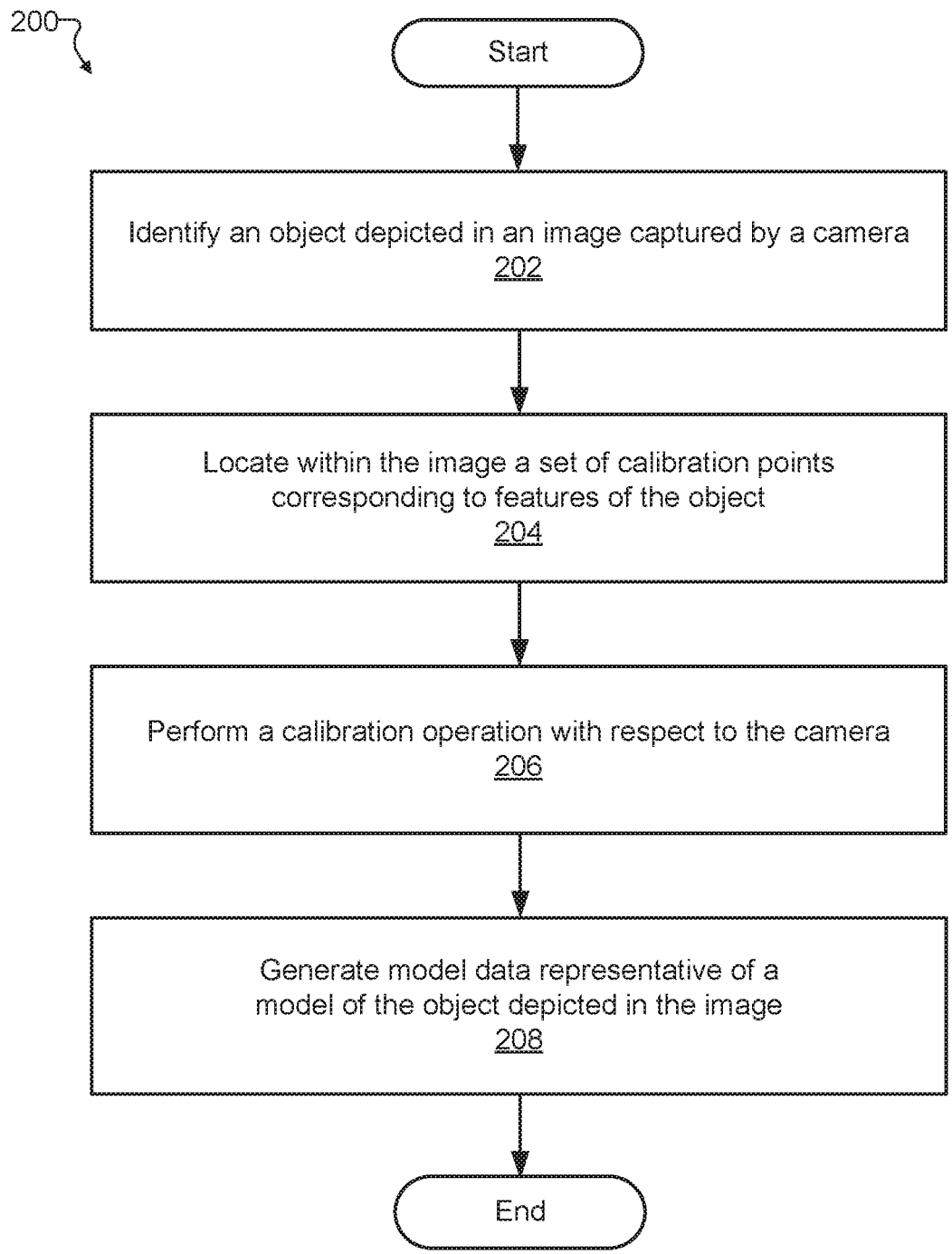
FIG. 2 shows an illustrative method for intra-capture camera calibration according to embodiments described herein.

As one example of functionality that processor 104 may perform, FIG. 2 shows an illustrative method 200 for intra-capture camera calibration in accordance with principles described herein. While FIG. 2 shows illustrative operations according to one embodiment, other embodiments may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by an image processing system such as system 100 and/or any implementation thereof.

As used herein, operations described as being performed "intra-capture" by an implementation of system 100 (or components thereof, related systems communicatively coupled to system 100, etc.) will be understood to be performed during normal operation of an image processing system, rather than, for example, being performed during a special operating mode of the system when normal operation is suspended or has not yet begun. For example, for an image processing system configured to perform volumetric modeling of a scene captured by cameras having vantage points at various locations around the scene, normal operation may be performed while objects of interest (e.g., objects that are to be modeled) are present at the scene, while scene imagery is being acquired (e.g., captured by the cameras), and/or while volumetric models of the objects are being generated and maintained based on the acquired image data. In contrast, special operation for this type of system may refer to a dedicated pre-acquisition calibration-only mode within which the system may operate prior to objects of interest being introduced into the scene and/or modeled by the system. For instance, when an image processing system operates in a dedicated calibration mode, objects present at the scene and/or analyzed during processing may be limited to dedicated calibration objects (e.g., chessboards, etc.) that are not volumetrically modeled and will be removed prior to normal operation of the system.

While various examples described in relation to method 200 and other embodiments described herein may refer to concepts associated with volumetric capture systems, it will be understood that other types of image processing systems (e.g., systems whose primary target is not necessarily to generate volumetric models of objects and scenes) may likewise benefit from intra-capture camera calibration described herein. For instance, these other types of systems may similarly perform calibration operations based on ordinary, recognized objects (e.g., human bodies, etc., rather than dedicated calibration objects such as chessboards, etc.) during normal operation, rather than during a pre-capture calibration mode or other special mode of operation. Each of operations 202-208 of method 200 will now be described in more detail.

At operation 202, system 100 may identify an object depicted in an image captured by a camera. In some examples, the camera may be integrated with or considered to be part of system 100, while, in other examples, the camera may be separate from, but communicatively coupled to, system 100. In either case, the camera may provide the image to system 100 such that image processing performed at operation 202 may identify the object. The object identified at operation 202 may be an object that is recognizable to system 100 and for which additional data is available to system 100 (e.g., as opposed to an object that would be novel to, or unrecognized by, system 100). Such an object may be referred to as a "recognized" object and may include any of the objects described herein (e.g., human bodies, human faces, pre-analyzed furniture objects or other inanimate objects, etc.) that system 100 may have special insight about (e.g., by being able to access data such as machine learning models that will be described in more detail below). As one example, based on preconfigured data accessible to system 100, system 100 may gain special insight into human body objects that allow system 100 to, for instance, identify a human body within an image, identify various features (e.g., joints, body parts, etc.) of the human body regardless of the pose of the body in the image, and so forth.

At operation 204, system 100 may locate a set of calibration points within the image. The set of calibration points may correspond to features of the object identified at operation 202, and may be located based on the special insight system 100 has with respect to the recognized object. For example, referring again to the example of a human body serving as a recognized object within the image, system 100 may identify a pose of the body that includes a form of the body (e.g., a way that the joints of the body are configured so as to create a standing form, a sitting form, a running form, a jumping form, or any of hundreds or thousands of other potential forms), an orientation of the body in 3D space (e.g., a direction in which the body is facing in whichever form it takes), and a location of the body within the scene. The pose of the body may be identified based on a machine learning model accessible to system 100 (e.g., or other special insights into human bodies or other recognized objects that system 100 may have), and may allow system 100 to locate features such as, for instance, a head feature, hand features, feet features, elbow joints, hip joints, shoulder joints, knee joints, and so forth. By identifying these object features in the image, and based on a normalized model defining various poses of the recognized object (e.g., which direction and how far certain joints are able bend, etc.), system 100 may be able to locate the features within a world coordinate space of the scene that is shared with other cameras. For example, each feature may be assigned a particular coordinate point for where the feature is detected to be in the world coordinate space based on the image.

At operation 206, system 100 may perform a calibration operation with respect to the camera. For example, the calibration operation may be performed at operation 206 based on the set of calibration points identified and located at operation 204. The calibration operation performed at operation 206 may include any suitable operation that helps to initialize intrinsic and/or extrinsic calibration parameters for the camera, to maintain (e.g., update, correct, modify, etc.) accurate intrinsic and/or extrinsic calibration parameters for the camera, or the like. For example, based on the located calibration points and what is known about the recognized object, system 100 may determine that lens distortion is occurring near an edge of a field of view of the camera and may initialize or correct intrinsic parameters of the camera to account for the lens distortion. As another example, extrinsic parameters defining the scene alignment for a set of cameras capturing the same scene from different vantage points may be initialized or corrected based on how well the locations of calibration points align when located based on images captured by different cameras. For instance, if other cameras generally agree on the location of a calibration point (e.g., an elbow joint of a human body object) but a particular camera has determined a slightly different location for the calibration point, extrinsic parameters may be adjusted with respect to the particular camera to bring the particular camera into agreement or alignment with the other cameras.

At operation 208, system 100 may generate model data representative of a model of the object depicted in the image. For example, system 100 may generate data used to initialize or maintain (e.g., to update, animate, etc.) a volumetric model of the same recognized object (e.g., the human body object) that has been used for camera calibration in the operations described above. The generation of the model data at operation 208 may be performed based on the image captured by the camera and that depicts the object. As such, the same image may be used for both calibrating the camera and for performing volumetric modeling or other such tasks during normal operation of system. As has been described, these concurrent uses for the same image during normal operation of the system allow system 100 to perform intra-capture camera calibration that provides various advantage over conventional camera calibration techniques that would require different objects to be present at the scene (e.g., a dedicated calibration object rather than a recognized object that is to be modeled) and that would require the calibration system to be put into a dedicated calibration mode (e.g., a pre-capture calibration mode rather than an intra-capture mode of normal operation).

Figure 3:
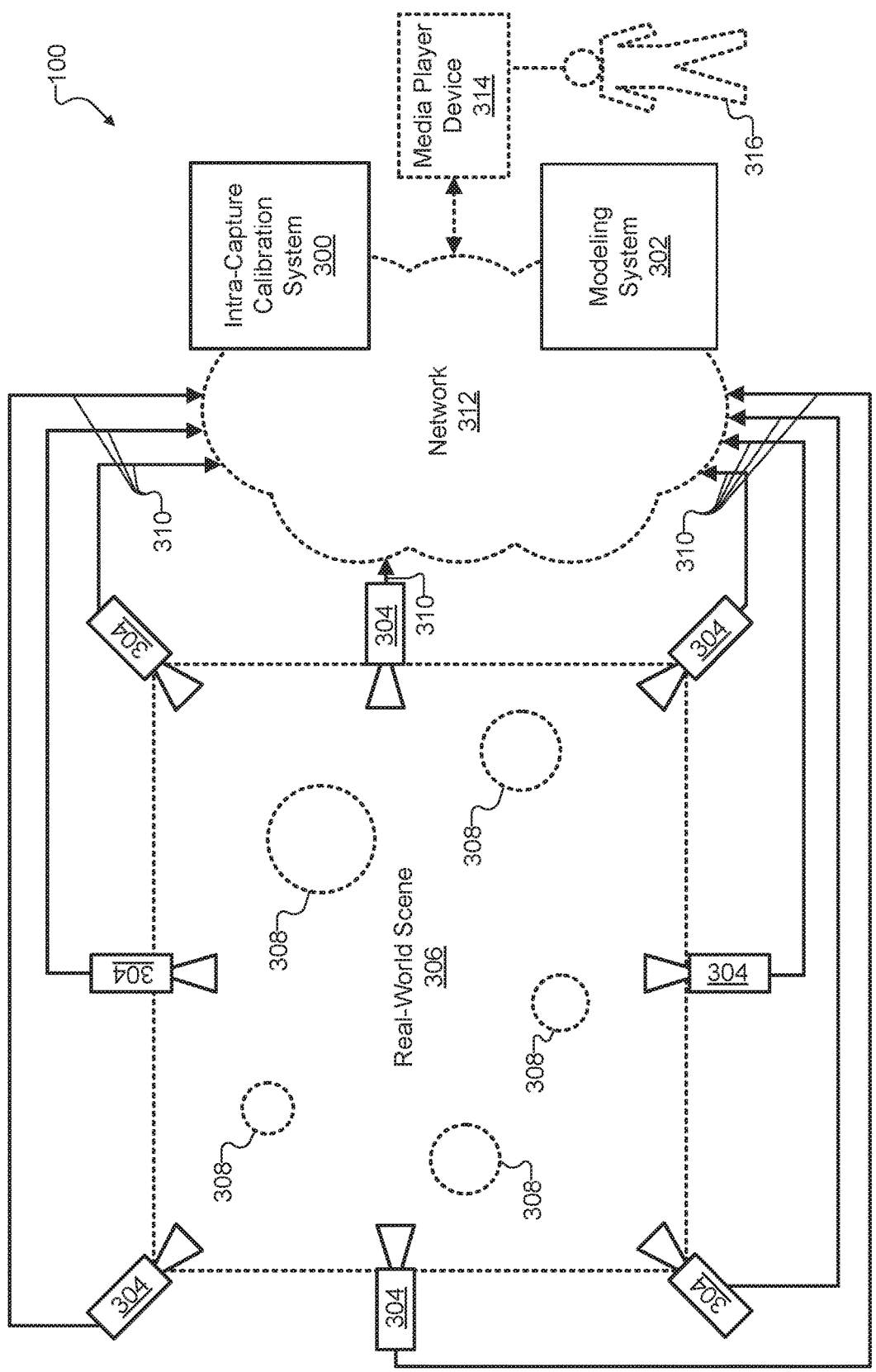
FIG. 3 shows an illustrative implementation of the image processing system of FIG. 1 operating in an illustrative configuration according to embodiments described herein.

FIG. 3 shows an illustrative implementation of system 100 operating in an example configuration in accordance with principles described herein. As shown by the items depicted with solid lines, the implementation of system 100 shown in FIG. 3 includes an intra-capture calibration system 300, a modeling system 302, and a plurality of cameras 304. Additionally, as illustrated by items depicted with dotted lines in FIG. 3, the components of system 100 may be configured to interoperate within a configuration featuring other items that are not necessarily included as part of system 100. For example, a real-world scene 306 including several objects 308 is shown along with a network 312, a media player device 314, and a user 316.

It will be understood that items depicted with dotted lines in FIG. 3 are not considered to be included within system 100 in the example implementation illustrated, while items depicted with solid lines in FIG. 3 are considered to be part of system 100 in this example. However, it will also be understood that other implementations of system 100 may include more or fewer items than depicted in FIG. 3. For instance, in certain system 100 implementations, a single image processing system may implement both intra-capture calibration system 300 and modeling system 302 (rather than the systems being separated out as shown in FIG. 3). As another example, the set of cameras 304 may not be included as part of certain implementations of system 100, but rather may operate independently from (and be communicatively coupled to) system 100.

Cameras 304 may represent a set of video cameras, still cameras, depth capture devices, infrared cameras, or other suitable types of cameras configured to capture real-world imagery and to provide images to systems configured to perform image processing (e.g., intra-capture calibration system 300, modeling system 302, etc.). To this end, as shown, the set of cameras 304 may be disposed at locations having different vantage points of real-world scene 306, which, as mentioned above, may include one or more objects 308. Each camera 304 may output image data 310, which may be representative of captured imagery (e.g., still images, video imagery, etc.) depicting objects 308 within real-world scene 306. Image data 310 may be provided to intra-capture calibration system 300 and/or modeling system 302 in any suitable way. For example, image data 310 may be provided to intra-capture calibration system 300 and/or modeling system 302 by way of direct communicative connections (not explicitly shown) and/or by way of network 312, which may implement and/or employ any suitable communication technologies, devices, media, protocols, or the like as may serve a particular implementation.

While objects 308 are depicted as differently-sized circles, these objects will be understood to represent various types of objects that may be found in a particular real-world scene and that may be targets for volumetric modeling or other types of image processing described herein. For instance, objects 308 may represent people, props, animals, vehicles, inanimate objects, and so forth. Real-world scene 306 may be implemented as any type of indoor or outdoor scene having any size or other characteristics as may serve a particular implementation. For instance, in one example, real-world scene 306 may be a studio setting where a single object 308 is included within the real-world scene for the purpose of generating and updating a volumetric model of the object. Conversely, in another example, real-world scene 306 may be a relatively large event venue such as a playing field where a sporting event is taking place or a stage where a concert or other such event is being performed. In these examples, a large number of objects 308 (e.g., a large number of people and/or other suitable subjects) may be modeled concurrently.

In various examples, cameras 304 may capture color data (i.e., red-green-blue (RGB) data), grayscale data, depth data, or any combination of these or other suitable types of data representative of objects 308 within real-world scene 306. To this end, cameras 304 may be implemented as two-dimensional (2D) capture devices (e.g., video cameras, still cameras, etc.) configured to generate 2D imagery depicting objects 308 from the respective vantage points of cameras 304, depth capture devices (e.g., time of flight depth capture devices, stereoscopic depth capture devices, etc.) that scan objects 308 from the respective vantage points of cameras 304 to determine spatial properties of the surfaces of objects 308 in 3D space, or any other suitable types of cameras. In examples where cameras 304 capture both color and depth data, the resultant data provided to system 100 may be referred to as RGBD data or surface data.

Image data 310 provided by each camera 304 may represent one or more images (e.g., standalone 2D images, frames of 2D video images, etc.) that have been captured and/or otherwise generated by cameras 304. This data may be communicated to intra-capture calibration system 300 and/or modeling system 302 by way of a communication interface that communicatively couples each camera 304 to other components of system 100. For example, as mentioned above, the communication interface may include network 312 in some examples, and may involve any suitable wired or wireless communication interface as may serve to carry image data 310 from a location of real-world scene 306 to a location of intra-capture calibration system 300 and/or modeling system 302 (e.g., which may be located at the same site or at a different site remote from real-world scene 306).

Intra-capture calibration system 300 may access (e.g., receive, retrieve, download, etc.) image data 310 captured by cameras 304 and process the data to perform intra-capture camera calibration in any of the ways described herein. For example, intra-capture calibration system 300 may identify an object 308 depicted in one or more images included within image data 310 (and provided by one or more different cameras 304). The identified object 308 may be an ordinary object (e.g., an object other than a dedicated calibration object) that is to be modeled as part of ongoing modeling operations taking place with respect to real-world scene 306 and objects 308. For example, the identified object 308 may be a human body, a human face, a piece of furniture or other inanimate object, or any other suitable object 308 present within real-world scene 306.

Figure 4:
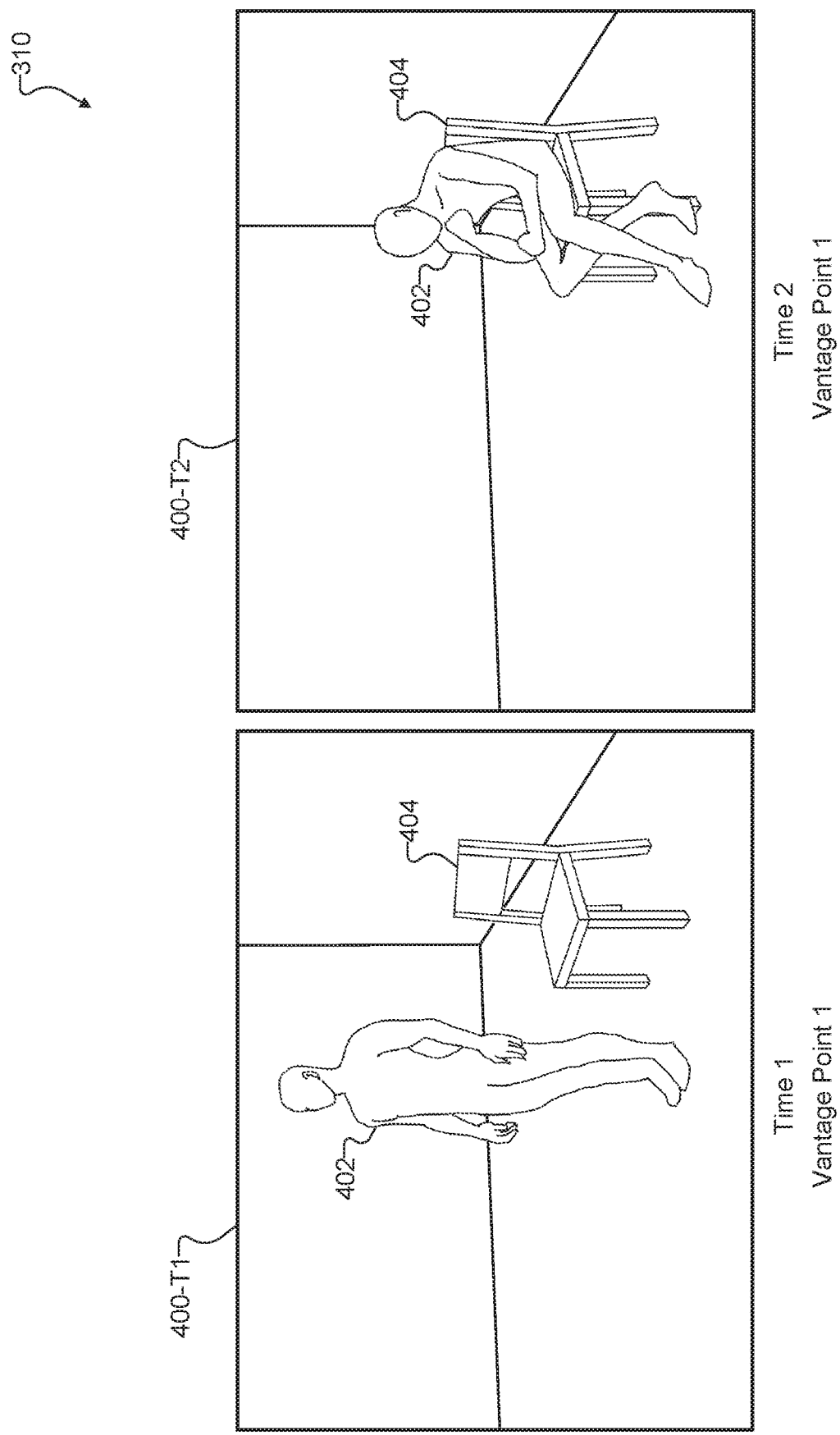
FIG. 4 shows illustrative images that depict illustrative objects and that are captured at different times by a camera at an illustrative vantage point in accordance with principles described herein.
Figure 5:
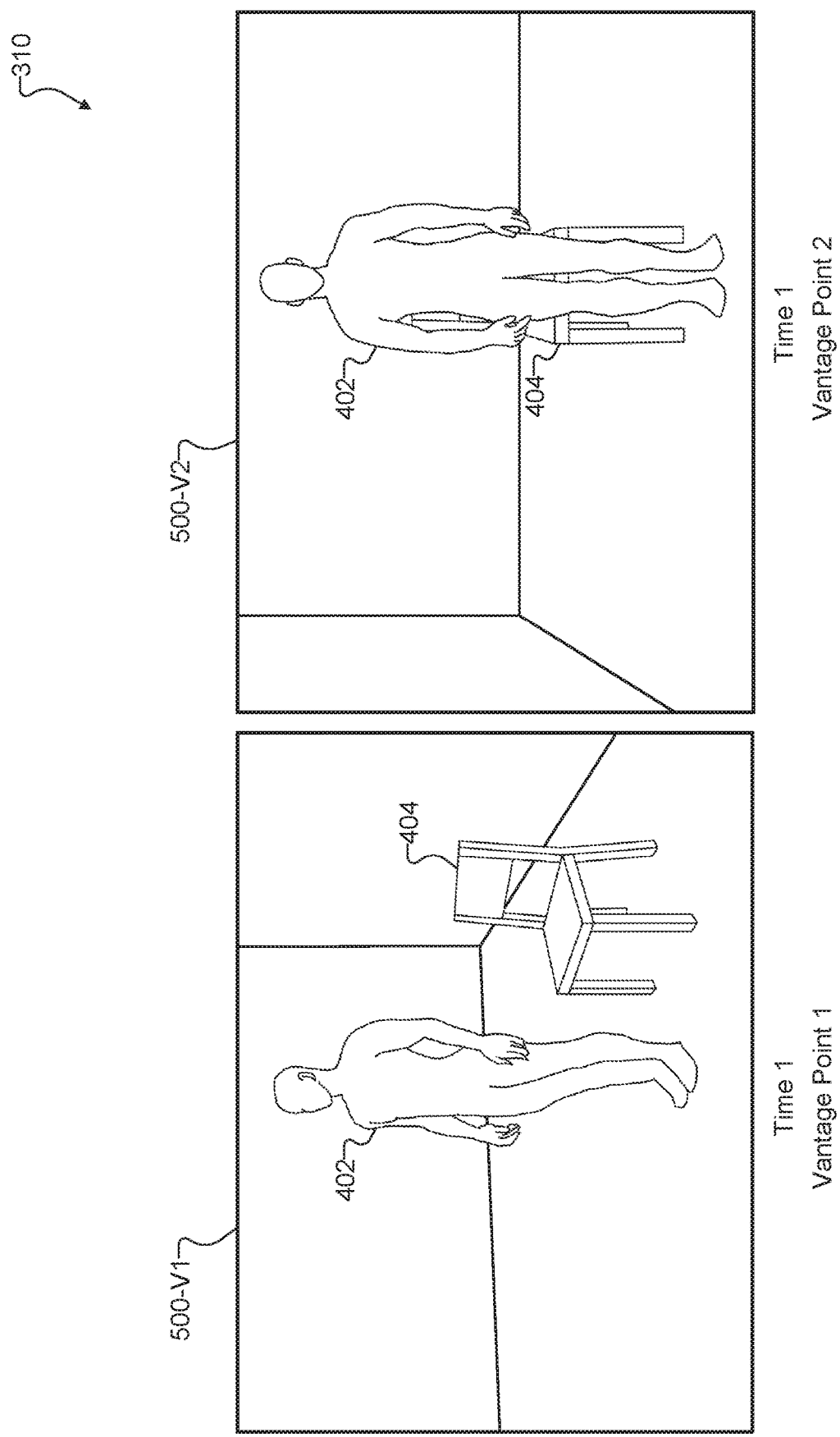
FIG. 5 shows illustrative images that depict the illustrative objects of FIG. 4 and that are captured synchronously by different cameras at different illustrative vantage points in accordance with principles described herein.

To illustrate one particular example, FIG. 4 shows illustrative images 400 (e.g., images 400-T1 and 400-T2) that are captured at different times by a single camera 304 located at a particular vantage point, and FIG. 5 shows illustrative images 500 (e.g., images 500-V1 and 500-V2) that are captured synchronously (e.g., at approximately the same time) by different cameras 304 at different illustrative vantage points with respect to real-world scene 306. In each of images 400 and 500, examples of illustrative objects 308 present at real-world scene 306 are depicted, including, specifically, a person 402 (also referred to herein as a human body object 402) and a chair 404 (also referred to herein as an inanimate object 404).

Because images 400 are captured by the same camera 304 from the same vantage point, but at different times (e.g., at a time T1 for image 400-T1, and at a time T2 for image 400-T2), FIG. 4 illustrates that certain aspects of objects 402 and 404 may change over time (e.g., person 402 may change from a standing form at one location to a sitting form at another location that partially obscures chair 404). In contrast, because images 500 are captured by different cameras 304 from different vantage points (e.g., at a vantage point V1 for image 500-V1 and at a vantage point V2 for image 500-V2), but at synchronous times (e.g., at approximately the same time), FIG. 5 illustrates how different aspects of objects 402 and 404 appear differently when viewed from different angles.

Returning to FIG. 3, intra-capture calibration system 300 may, after accessing images represented in image data 310 (e.g., images 400 and/or 500) and after identifying one or more objects 308 depicted therein (e.g., human body object 402 and/or inanimate object 404), perform intra-capture calibration management in any suitable manner. For example, intra-capture calibration system 300 may locate, within a particular image (e.g., one of images 400 or 500), a set of calibration points corresponding to features of one or more of the identified objects 308. For example, if intra-capture calibration system 300 has identified human body object 402 as a recognized object for which intra-capture calibration system 300 may have special insight (e.g., based on a machine learning model accessible to intra-capture calibration system 300, etc.), intra-capture calibration system 300 may rely on that information to locate the set of calibration points within the scene.

For instance, based on a machine learning model representative of human body objects generally, intra-capture calibration system 300 may locate various joints and/or other body parts on human body object 402. In addition or as an alternative to locating calibration points with respect to human body object 402, intra-capture calibration system 300 may similarly locate a set of calibration points with respect to inanimate object 404. Once the set of calibration points is located, intra-capture calibration system 300 may perform any of the calibration operations described herein based on the set of calibration points. For example, intra-capture calibration system 300 may manage (e.g., initialize, revise, update, etc.) intrinsic and/or extrinsic calibration parameters of the camera or cameras 304 that provided images 400 and/or 500.

Modeling system 302 may be configured to generate model data based on image data 310 (e.g., based on the same image or images used by intra-capture calibration system 300 for intra-capture camera calibration, such as images 400 and/or 500). The generated model data may, for example, be representative of one or more models (e.g., volumetric models) of one or more of the objects 308 depicted in the images (e.g., person 402, chair 404, etc.). To volumetrically model a particular object 308 such as person 402, modeling system 302 may use several images captured synchronously from several different vantage points (e.g., provided by several different cameras 304) for each frame of the model. Then, as time proceeds forward, modeling system 302 may use additional sets of synchronous images to update the model as person 402 changes pose (e.g., changes form, moves to a different location, turns to a different orientation, etc.) within real-world scene 306. Accordingly, modeling system 302 may make use of both of images captured by the same camera 304 at different times (e.g., images 400 of FIG. 4) and images captured by different cameras 304 at the same time (e.g., images 500 of FIG. 5). It will be understood, as mentioned above, that any or all of the same image data 310 used by modeling system 302 may also be employed by intra-capture calibration system 300 to perform intra-capture camera calibration with respect to cameras 304.

Models of objects 308, once generated and while being updated and otherwise managed by modeling system 302, may be provided for use in any application as may serve a particular implementation. For example, a volumetric model generated and continuously updated by modeling system 302 may be provided (e.g., by way of network 312) to a media player device 314 associated with a user 316.

For this task, network 312 may include additional network elements and characteristics than those described above for the task of transmitting image data 310. For example, as part of or in addition to the network elements described above, network 312 may include elements of a provider-specific wired or wireless communications network (e.g., a cellular network used for mobile phone and data communications, a 5G network or network of another suitable technology generation, a cable or satellite carrier network, a mobile telephone network, etc.) operated and/or managed by a provider entity such as a mobile network operator (e.g., a wireless service provider, a wireless carrier, a cellular company, etc.). Additionally or alternatively, network 312 may include elements of various interconnected networks that are outside of any provider network and outside the control of any provider of such a provider network. Elements of the Internet, a wide area network, a content delivery network, and/or any other suitable network or networks are examples of other elements that may be included within network 212. Any of these provider or non-provider networks or network elements may provide data delivery between system 100 and media player device 214.

Media player device 314 may be implemented as any type of computing device used by user 316 to experience a volumetric model generated by modeling system 302 or any other image processing output that system 100 may provide in other (e.g., non-modeling) types of implementations. For example, if a volumetric model is to be presented as part of an extended reality experience (e.g., a virtual reality experience, an augmented reality experience, etc.) in which user 316 is engaged, media player device 314 may be implemented as an extended reality device (e.g., a head-mounted device) configured to present the extended reality experience. In the same or other examples, media player device 314 may be implemented as a general-purpose computing device (e.g., a mobile device such as a smartphone or tablet device, a personal computing device such as a laptop computer, etc.). Such a device may present an extended reality experience to user 316 that features volumetric models of objects 308 in certain examples. In other examples, such a device may present volumetric or other models in other suitable types of applications such as communications applications (e.g., a 3D video phone), engineering applications (e.g., a 3D computer-aided design application), or any other type of application that makes use of 2D or 3D object models.

Figure 6:
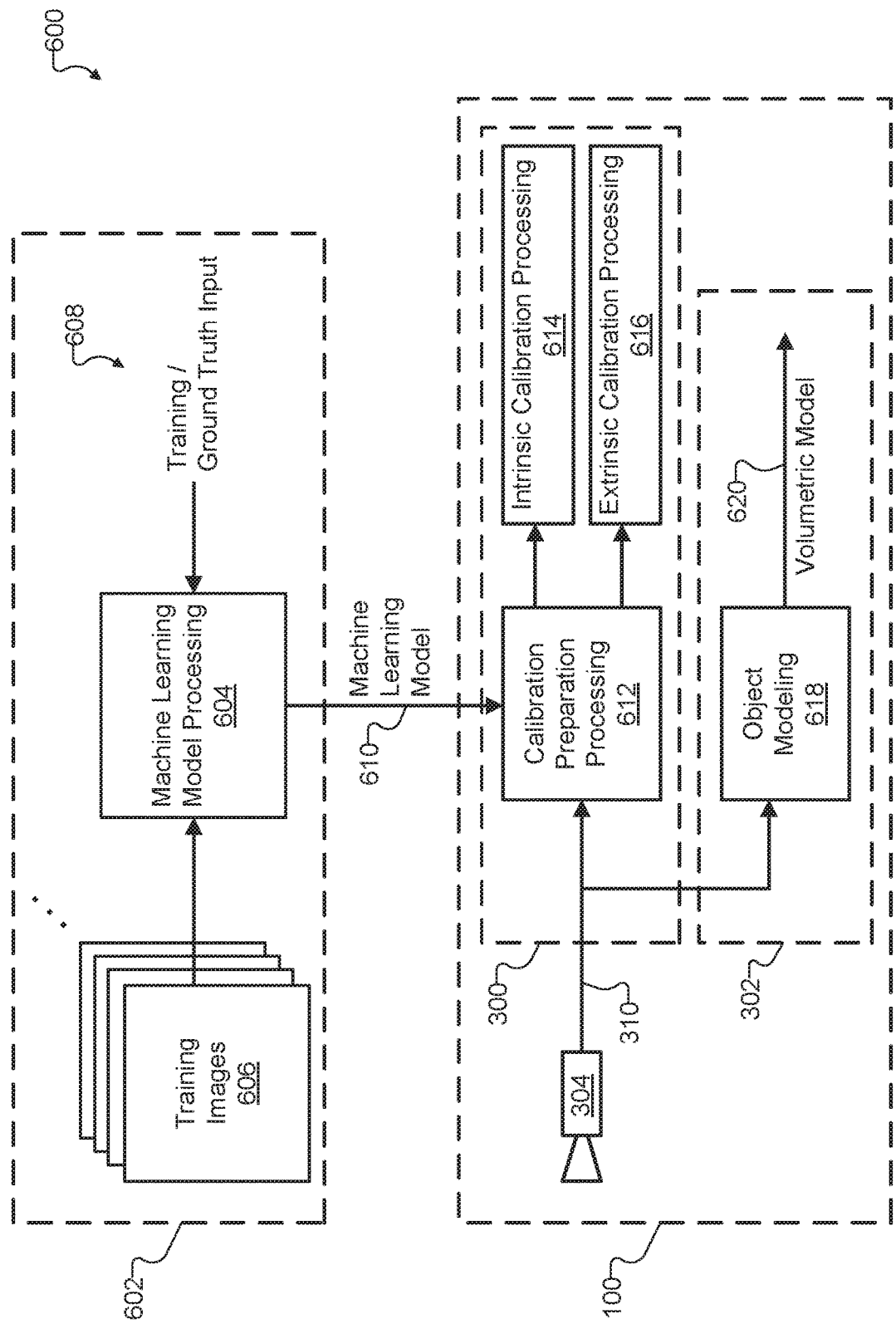
FIG. 6 shows an illustrative block diagram depicting operations for managing intra-capture camera calibration according to embodiments described herein.

FIG. 6 shows an illustrative block diagram 600 depicting operations for managing intra-capture camera calibration according to principles described herein. Various data and operations depicted in FIG. 6 are shown within dashed-line boxes to represent which system or systems may generate and/or receive the data, or perform the operations, in a particular example illustrated by FIG. 6. Specifically, as shown, a machine learning system 602 may perform an operation 604 for machine learning model processing, and, in doing so, may use data from a set of training images 606 and input data 608 representative of training input or ground truth input about each training image 606. A machine learning model 610 may be generated and maintained (e.g., updated, corrected, enhanced, and/or otherwise managed) as a product of operation 604. Machine learning model 610 may serve as an input to an operation 612 for calibration preparation processing, which may be included within intra-capture calibration system 300 of system 100, and which may also receive image data 310 from one or more of cameras 304. Operation 612 may provide processed data to operations 614 and 616, which are configured to handle, respectively, intrinsic calibration processing (e.g., managing intrinsic calibration parameters for the camera 304) and extrinsic calibration processing (e.g., managing extrinsic calibration parameters for the camera 304). Also included within system 100 is modeling system 302 which, upon receiving the same image data 310 as intra-capture calibration system 300, performs an operation 618 associated with object modeling. As shown, operation 618 may result in a volumetric model 620 that can be provided to a media player device as described above. Each of the operations shown in FIG. 6 will now be described in more detail.

Operation 604, which may be performed by a machine learning system 602 that is integrated with or separate from and communicatively coupled to system 100, is configured to facilitate feature extraction performed by system 100. For example, operation 604 may generate and maintain machine learning model 610 of a recognized object (e.g., a human body object, etc.) that provides system 100 with specific information (e.g., special insight) regarding the recognized object so as to allow system 100 to accurately locate calibration points associated with features of the recognized object. By providing machine learning model 610 as part of operation 604, machine learning system 602 may help system 100 eliminate visual errors, thereby resulting in an improved dataset for performing both localized and globalized camera calibration operations. In certain examples, system 100 may locate calibration points corresponding to features of a recognized object without relying on a machine leaning model such as machine learning model 610. However, when operation 604 is performed so as to make machine learning model 610 available, the model may serve as a data filter or screen to help ensure that input data that is used for camera calibration is highly accurate and likely to result in a high-quality camera calibration.

In operation, machine learning system 602 may perform operation 604 to generate and manage machine learning model 610 based on training images 606 and input data 608 (e.g., training/ground truth input data) that may involve human input such as from expert annotators or other sources (e.g., crowdsourcing, etc.). Machine learning system 602 may incorporate one or more machine learning networks configured to perform various types of machine learning tasks. For instance, one machine learning network incorporated into machine learning system 602 may be a semantic segmentation network configured to semantically segment different components of an object such as different body parts (e.g., right hand, left hand, head, torso, etc.) for a human body object such as human body object 402. Another machine learning network incorporated into machine learning system 602 may be a joint detection network configured to identify various joints of an object regardless of how the body is posed (since certain types of objects such as human body objects may be formed and/or oriented in a large number of different ways). Operation 604 may represent any operation or operations performed by either of these illustrative machine learning networks or any other suitable operations performed in the generation or processing of machine learning model 610.

The training associated with operation 604 may make it possible for machine learning model 610 to be produced (e.g., generated, provided, updated, etc.), and may be performed using a combination of human input (e.g., by expert annotators, by open source contributors, etc.) and novel automation processes to make efficient use of the human contributors' time and ability in the creation of ground truth interpretations. Specifically, rather than relying on a training expert to locate each and every joint or segmentation line for each and every training image, machine learning system 602 may use machine learning model 610 itself (even as machine learning model 610 is being generated and improved) to locate joints and segments for each image. An annotation tool (e.g., a computer interface configured to facilitate the training process) that presents these estimations to a human expert may be employed to make it easy for the expert to either approve the estimations (if the expert determines that the system has estimated correctly and accurately), or to correct the estimations (if the expert determines that the system has erred). In this way, one or more human experts may team with machine learning system 402 in the machine learning training process to efficiently manage machine learning model 610. In some examples, machine learning training processes may also use previously trained datasets or non-expert human trainers (e.g., crowd-sourced human resources) or other training techniques as may serve a particular implementation.

Machine learning system 602 may provide machine learning model 610 to system 100 to assist system 100 in processing image data 310 received from one or more capture devices 304. For example, based on machine learning model 610, intra-capture calibration system 300 (which, as shown, may be included as part of system 100) may perform operation 612 to accurately and efficiently locate calibration points corresponding to features of the recognized object represented by machine learning model 610.

For example, at operation 612, intra-capture calibration system 300 may identify an object represented in image data 310, and, in response to identifying the object, may detect a pose of the object which, as described above, may include various aspects such as the location of the object within the real-world scene, the orientation of the object in 3D space, and the form of the object (e.g., the manner in which various joints and segments of the object are configured). In some examples, the detecting of the pose of the identified object at operation 612 may include detecting the form or other aspects of the pose of the object based on machine learning model 610. For example, as one type of preestablished dataset that is developed using a machine learning technology and that defines a set of recognized forms for the object, machine learning model 610 may assist system 100 in analyzing the pose of the object as depicted in 2D images of image data 310. Intra-capture calibration system 300 may also, as part of operation 612, locate a set of calibration points corresponding to the features of the identified object.

For example, the locating of the calibration points may be performed based on the detected pose of the object that was determined with the assistance of machine learning model 610.

Figure 7:
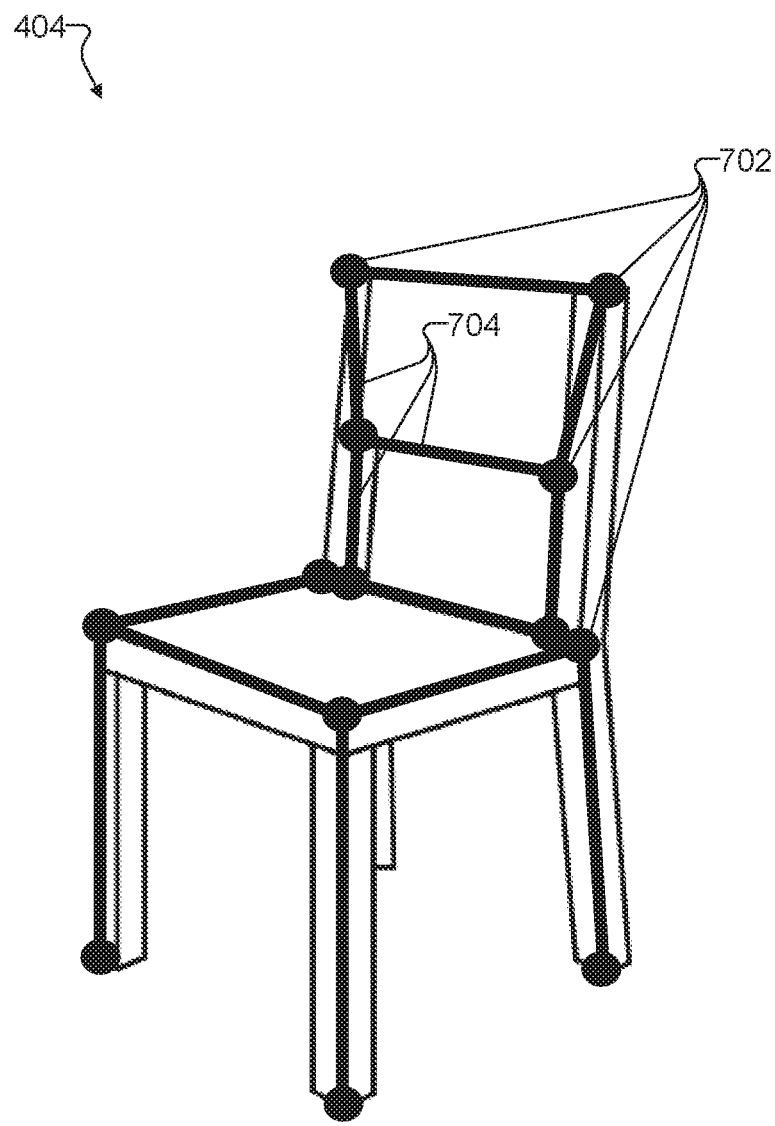
FIG. 7 shows an illustrative set of calibration points corresponding to features of a chair object according to embodiments described herein.
Figure 8:
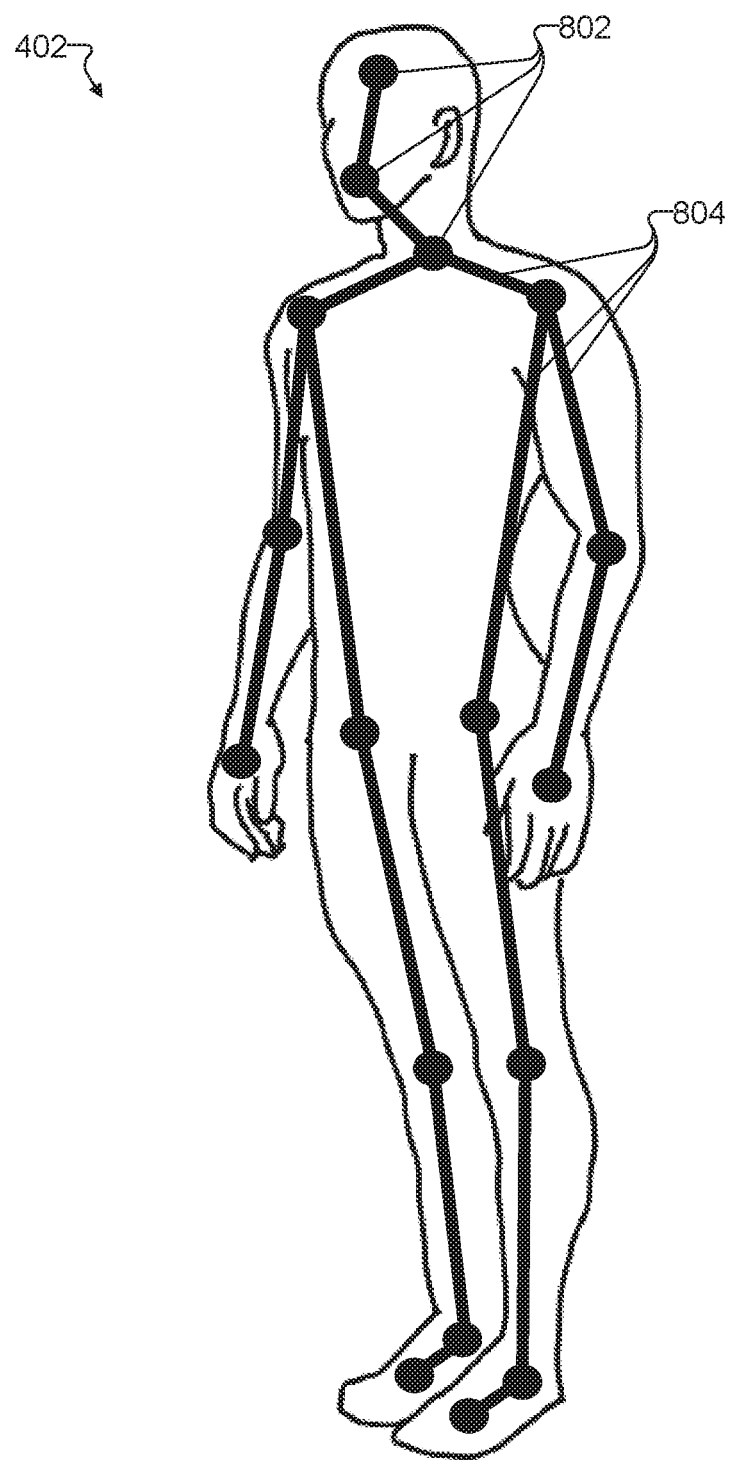
FIG. 8 shows an illustrative set of calibration points corresponding to features of a human body object according to embodiments described herein.

To illustrate, FIG. 7 shows an example set of calibration points corresponding to features of inanimate object 404 (i.e., chair 404), while FIG. 8 shows an example set of calibration points corresponding to features of human body object 402 (i.e., person 402), as these calibration points may be identified by intra-capture calibration system 300 at operation 612.

While chair 404 and person 402 are used as example objects 308 for purposes of this description, it will be understood that the recognized object used for intra-capture camera calibration (e.g., the object modeled by machine learning model 610) may be any type of object 308 that may be depicted in image data 310 and identified by system 100. In particular, the recognized object may be an object that is naturally included within the real-world scene, that is to be modeled and ultimately presented to a user such as user 316, that is readily analyzable and understood by system 100 (e.g., as a result of machine learning model 610), and/or that is an object other than the types of dedicated calibration objects relied on by conventional (e.g., pre-capture) calibration management systems.

In certain examples, as exemplified by objects 402 and 404 in FIGS. 7 and 8, the recognized object may be a 3D object (e.g., rather than, for example, a 2D chessboard pattern or the like as is commonly employed by conventional calibration methods). With a 3D object, the set of calibration points may include both 1) a subset of calibration points that correspond to coplanar features of the object, and 2) at least one additional calibration point corresponding to an additional feature of the object that is not coplanar with the coplanar features of the object. In other words, as illustrated by a set of calibration points 702 in FIG. 7 (e.g., all the black circles, only a few of which are explicitly called out), the calibration points may be on various different planes rather than all limited to a single plane. Several calibration points 702 at the corners of the seat of chair 404 may be coplanar with one another in the example of FIG. 7, for instance, while other calibration points 702 on the back and legs of the chair are on different planes and are not coplanar with the calibration points of the seat. By providing multiplanar calibration points 702 in this way, a 3D object such as chair 404 may provide improved calibration data (e.g., allowing for more detailed local calibration, etc.) as compared to a 2D object having all of its calibration points coplanar with one another (e.g., a dedicated chessboard calibration object, etc.).

Calibration points 702 are shown to be associated with corners and/or other readily identifiable features of object 404. Between calibration points 702, a plurality of segments 704 are illustrated connecting the corner features. For a chair style that is well-modeled by machine learning model 610, segments 704 may be normalized as chair 404 is analyzed at operation 612. For example, to compare segment lengths, a metric 3D structure may be designed over the entire sequence and a median length for each segment 704 may be computed. These median values may then be normalized such that each particular segment (e.g., the width of the chair, the height of each leg, etc.) have unit length before comparing them with ground truth values of machine learning model 610.

While chair 404 is an inanimate object that can likely only take one form (although it may still be posed in different locations and/or with different orientations in the real-world scene), more benefits still may arise when the recognized object used for calibration is not only three-dimensional, but also animate and able to autonomously change form. Human body object 402 shown in FIG. 8 provides an example of one such object.

Human body object 402 in FIG. 8 may serve as a good example of an animate object that autonomously changes form (e.g., as illustrated above with respect to FIG. 4 by the difference between the standing form of person 402 as depicted at time T1 in image 400-T1 and the sitting form of person 402 as depicted at time T2 in image 400-T2). With an animate object such as human body object 402, a first form of the object in a first image (e.g., image 400-T1) may be distinct from a second form of the object in a second image (e.g., image 400-T2). Accordingly, for implementations in which a camera 304 is a video camera and an image being processed is included along with additional images in an image sequence (e.g., a video) captured by the video camera, intra-capture calibration system 300 may take advantage of the animate movements of the object to improve calibration management. For example, intra-capture calibration system 300 may locate a first set of calibration points 802 corresponding to features of human body object 402 while the object is in the first form (e.g., a standing form shown in FIG. 8 and image 400-T1), and may locate a second, corresponding set of calibration points that line up with the same features of the object within an second image captured while the object is in the second form (e.g., the sitting form shown in image 400-T2). These different forms and respective sets of calibration points may provide more information to system 100 than would be provided by a non-animate object. With this additional input data, system 100 may be better able to refine and fine-tune the calibration of each camera 304.

Similarly as described above for chair object 404, calibration points 802 may be associated with readily identifiable features of human body object 402 such as various joints of the body (e.g., shoulders, elbows, knees, etc.) as well as various body parts (e.g., the head, chin, hands, feet, etc.). Moreover, a plurality of segments 804 are shown to connect calibration points 802 to form a skeletal structure of person 402 that may be normalized and used for calibration purposes as described herein. After a first calibration operation is performed with respect to a camera 304 based on calibration points 802 from the first image (e.g., image 400-T1), intra-capture calibration system 300 may perform an additional calibration operation with respect to the camera 304 based on the additional set of calibration points from the second image (e.g., image 400-T2 where person 402 is in the sitting form). While the second form (e.g., the sitting form) and its respective set of calibration points are not explicitly shown in FIG. 8, it will be understood that these calibration points may be associated with the same features of human body object 402 as shown in FIG. 8 (e.g., the head, chin, shoulders, elbows, etc.), at least insofar as those features are depicted in both images despite the different forms taken by the body.

Precision and accuracy advantages for localized alignment using 3D objects rather than 2D objects was described above. For similar reasons, advantages may also arise when animate objects including a combination of rigid and non-rigid joints and segments are used rather than strictly rigid objects. Human body object 402 is an example of one such object that includes both rigid and non-rigid elements that together help provide thorough input data for an accurate camera calibration. Specifically, the set of calibration points 802 of human body object 402 is shown to include both: 1)

a subset of calibration points 802 corresponding to a rigid subset of features of the object having a static relationship to one another, and 2) an additional calibration point corresponding to a non-rigid feature of the object that has a dynamic relationship to the rigid subset of features. For example, a shoulder and an elbow of person 402 may form a rigid subset of features having a static relationship to one another because the shoulder and the elbow are joined by a single segment 804 (e.g., an upper arm segment) that is rigid and does not bend, change size (e.g., contract, enlarge, etc.), or the like. As shown, a calibration point corresponding to the shoulder and a calibration point corresponding to the elbow of person 402 may therefore make up a rigid subset of calibration points 802. At the same time, other features of person 402 have dynamic relationships to the rigid subset of the shoulder and elbow. For example, a hand feature on the same arm of person 402 is not rigidly related to the rigid shoulder/elbow feature subset because the hand may move at least somewhat independently from these joints. Other features such as the person's other hand, the head, and the feet may be even more independent from the rigid shoulder/elbow feature subset.

As person 402 autonomously changes pose image by image (e.g., from frame to frame of a video represented in image data 310 as person 402 walks around, sits down, waves his arms, etc.), intra-capture calibration system 300 may benefit from person's rigid and non-rigid features and corresponding calibration points 802. Just as having multi-planar calibration points helped calibrate cameras 304 with respect to multiple spatial parts of the real-world scene, an object that autonomously moves in complex (e.g., both rigid and non-rigid) ways while being fully analyzable and well-understood by the calibration management system (e.g., as a result of the machine learning data) may allow for highly accurate camera calibration. For example, such objects may provide more simultaneous equations that, when resolved by intra-capture calibration system 300, allow for accurate and dynamic global and local scene alignment.

As shown in FIG. 8, one suitable animate object may be an entire body of a human being (e.g., human body object 402) where the features of the animate object corresponding to calibration points 802 include joints and/or other body parts of the human being. A face of a human being may be another example of an animate object that has been thoroughly studied and documented (e.g., such that accurate machine learning models may be readily available defining the various poses, forms, and expressions of the face). In this example, the features of the animate object corresponding to the calibration points may include facial features of the human being such as a tip of a nose, cheekbones, corners of a mouth, eyeballs, eyebrows, ears, and so forth. In certain examples, both the full body and the face of the same human may both be simultaneously analyzed and relied on as calibration objects to improve globalized scene alignment on the relatively large scale of the body while also improving localized scene alignment on the relatively small scale of the face.

For animate objects that are able to take various different forms such as human body object 402 (e.g., which may take a standing form, a walking form, a sitting form, or many other forms) or the human face object described above (e.g., which may take a neutral form, a smiling form, a surprised form, or many other forms), system 100 may identify certain forms of the objects as core forms that are associated with particular operations. For example, a core form for the human body object may be a neutral standing position with the arms at the side and the person looking straight ahead (e.g., the form shown in FIG. 8), and a detection of the human body object in this form may trigger system 100 to perform particular operations such as to check and/or update the calibration features of all the cameras or a camera that the person is facing.

More particularly, for instance, system 100 (e.g., intra-capture calibration system 300) may determine that a detected form of a recognized object such as human body object 402 is included within a set of predefined core forms. In response to this determination, system 100 may detect an alignment error representative of a defect in an extrinsic calibration of the camera. Accordingly, system 100 may perform a calibration such as extrinsic calibration operation 616 (described in more detail below) in response to the detecting of the alignment error. For example, the calibration operation may be configured to correct the defect in the extrinsic calibration of the camera. By only checking the calibration and/or recalibrating certain cameras as triggered by certain core poses in this way, system 100 may achieve the benefits of continual intra-capture camera calibration while not wasting an unnecessary amount of processing power to check and recalibrate too often or when objects are in non-core forms that the system may have less confidence analyzing (e.g., and which may be more likely to be misinterpreted by the system so as to be less helpful for managing accurate camera calibration).

Returning to FIG. 6, after operation 612 has successfully analyzed an image to locate the set of calibration points corresponding to features of a recognized object (e.g., based on insights represented by machine learning model 610 as described above), intra-capture calibration system 300 may perform either or both of calibration operations 614 and 616. Calibration operations 614 and 616 may be performed in any suitable way to efficiently and accurately manage calibration parameters of cameras 304 based on the calibration points that have been identified and located at operation 612. Additionally, as shown, calibration operations 614 and 616 may be performed in an intra-capture manner by being performed concurrently with object modeling operation 618 (which may be performed in the ways described above to generate volumetric model 620 of the recognized object).

Operation 614 may be an intrinsic calibration operation configured to manage an intrinsic parameter of a camera 304 (or multiple intrinsic parameters of multiple cameras 304) and may include any intrinsic calibration processing as may serve a particular implementation. As intrinsic calibration processing is performed at operation 614, an assumption may be employed that each camera 304 has a unit aspect ratio and zero skew or another suitable default. Although at each time instant it may be possible to use an affine approximation (e.g., since shape variations of a human body object are typically much smaller than the viewing distance), motion of the object towards and away from the camera 304 may induce perspective effects over the sequence that system 100 may leverage in various ways. For instance, each putative feature match in an entire sequence may constrain the epipolar geometry such that this large feature set may be used to estimate the fundamental matrix robustly using a suitable methodology (e.g., a random sample consensus (RanSaC) methodology, etc.).

In certain examples, a calibration approach used by operation 614 or 616 may rely on a full perspective projection that assumes cameras 304 are fixed with respect to each other such that all image pairs in an entire sequence must share the same epipolar geometry. If machine learning model 610 is being used in these examples, it may be important to maintain an accurate error measure. This may be done using specific correspondence data (2D image coordinates paired with 3D world coordinates), since, without such data, it may be difficult to define a globally accurate error measure.

Once local and global structure is recovered using minimal parameterization, calibration processing at operation 614 may approximate the recovered structure with an articulated model of median segment lengths and estimated pose. System 100 may then further optimize all free parameters using a final bundle adjustment. At this point, skeleton constraints may be relaxed (because these constraints are uncertain in a projection) and minimization of the geometric reprojection error may be achieved by optimizing over several views of a particular frame.

Operation 616 may be an extrinsic calibration operation configured to manage extrinsic parameters of one or more cameras 304 and may include any extrinsic calibration processing as may serve a particular implementation. For example, as described and illustrated above with respect to FIG. 5, system 100 may identify a recognized object as depicted in multiple images (e.g., images 500-V1 and 500-V2) synchronously captured by multiple cameras, and may locate respective sets of calibration points corresponding to the same features of the recognized object for each of the multiple images. As such, the extrinsic calibration operation may be performed based on multiple (or all) of the respective sets of calibration points that have been identified and located from the different vantage points of the different cameras. For example, by analyzing where certain features of the recognized object appear to be in 3D space with respect to different vantage points, it may be determined that one camera 304 is slightly out of alignment with one or more other cameras (e.g., due to a disagreement as to the location of one or more calibration points associated with those certain features), and the alignment may be corrected by adjusting the extrinsic calibration parameters for that camera 304.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
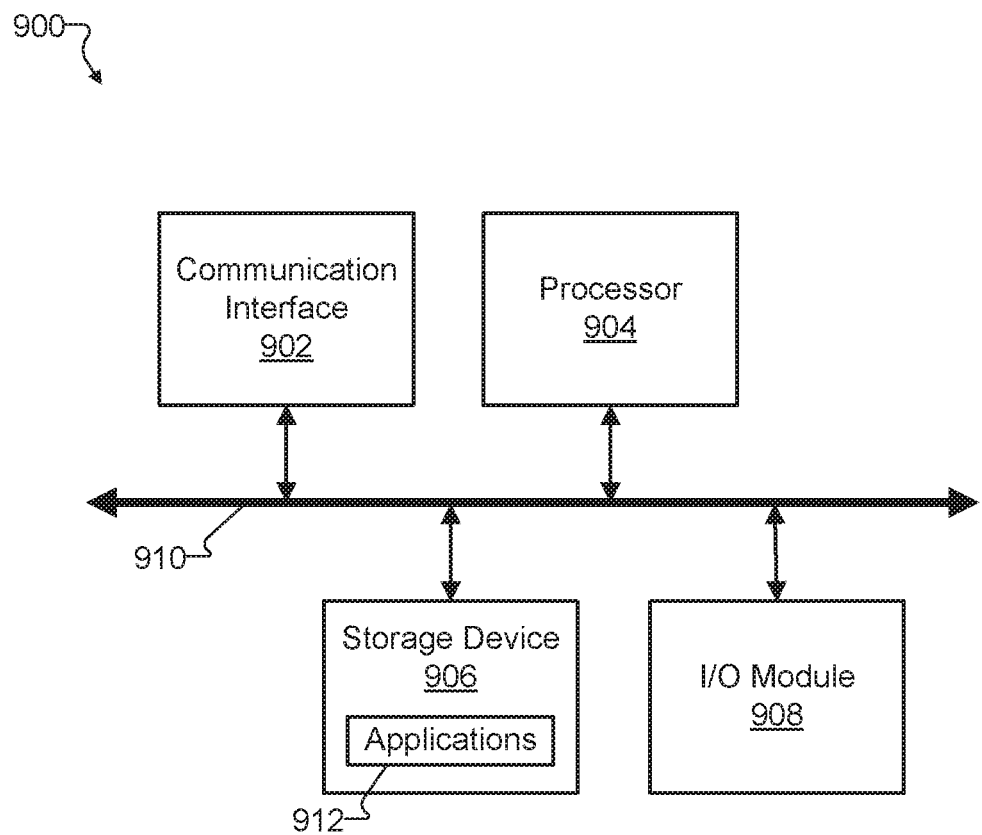
FIG. 9 shows an illustrative computing device according to embodiments described herein.

FIG. 9 shows an illustrative computing device 900 that may be specifically configured to perform one or more of the processes described herein. For example, computing system 900 may include or implement (or partially implement) an image processing system such as system 100 or any component included therein (e.g., an intra-capture calibration system such as intra-capture calibration system 300, a modeling system such as modeling system 302, control or communications elements of certain cameras 304, etc.), a machine learning system such as machine learning system 602, a media player device such as media player device 314, or any other computing systems or devices described herein.

As shown in FIG. 9, computing system 900 may include a communication interface 902, a processor 904, a storage device 906, and an input/output (I/O) module 908 communicatively connected via a communication infrastructure 910. While an illustrative computing system 900 is shown in FIG. 9, the components illustrated in FIG. 9 are not intended to be limiting. Additional or alternative components may be used in other embodiments. Components of computing system 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may also include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 900. For example, one or more applications 912 residing within storage device 906 may be configured to direct processor 904 to perform one or more processes or functions associated with processor 104 of system 100. Likewise, memory 102 of system 100 may be implemented by or within storage device 906.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various illustrative embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    identifying, by an image processing system, an object depicted in an image captured by a camera;
    locating, by the image processing system and within the image, a set of calibration points corresponding to features of the object;
    performing, by the image processing system and based on the set of calibration points, a calibration operation with respect to the camera; and
    performing, by the image processing system and concurrently with the performing of the calibration operation, an object modeling operation based on the image, the object modeling operation configured to generate model data representative of a volumetric model of the object depicted in the image.

2. The method of claim 1, wherein:
    the object is a three-dimensional (3D) object; and
    the set of calibration points includes a subset of calibration points that correspond to coplanar features of the object and an additional calibration point corresponding to an additional feature of the object that is not coplanar with the coplanar features of the object.

3. The method of claim 1, wherein:
    the camera is a video camera;
    the image is included along with an additional image in an image sequence captured by the video camera;
    the object is an animate object that autonomously changes form such that a first form of the object in the image is distinct from a second form of the object in the additional image;
    the generating of the model data representative of the model of the object is further based on the additional image; and
    the method further comprises:
        locating, by the image processing system and within the additional image, an additional set of calibration points corresponding to the features of the object while the object is in the second form, and
        performing, by the image processing system and based on the additional set of calibration points, an additional calibration operation with respect to the camera.

4. The method of claim 3, wherein:
    the animate object is an entire body of a human being; and
    the features of the object include joints of the human being.

5. The method of claim 3, wherein:
    the animate object is a face of a human being; and
    the features of the object include facial features of the human being.

6. The method of claim 3, wherein:
    the set of calibration points includes a subset of calibration points corresponding to a rigid subset of features of the object having a static relationship to one another; and
    the set of calibration points further includes an additional calibration point corresponding to a non-rigid feature of the object that has a dynamic relationship to the rigid subset of features.

7. The method of claim 1, wherein the calibration operation is an intrinsic calibration operation configured to manage an intrinsic parameter of the camera.

8. The method of claim 1, further comprising:
    identifying, by the image processing system, the object as depicted in an additional image synchronously captured by an additional camera when the camera captures the image; and
    locating, by the image processing system and within the additional image, an additional set of calibration points corresponding to the features of the object;
    wherein:
        the calibration operation is an extrinsic calibration operation configured to manage an extrinsic parameter of the camera,
        the performing of the extrinsic calibration operation is further based on the additional set of calibration points, and
        the generating of the model data representative of the model of the object is further based on the additional image.

9. The method of claim 1, further comprising detecting, by the image processing system in response to the identifying of the object in the image, a pose of the object;
    wherein the locating of the set of calibration points corresponding to the features of the object is based on the detected pose of the object.

10. The method of claim 9, wherein the detecting of the pose of the object includes detecting a form of the object based on a preestablished dataset that is developed using a machine learning technology and that defines a set of recognized forms for the object.

11. The method of claim 9, further comprising:
determining, by the image processing system, that a detected form of the object is included within a set of predefined core forms; and
detecting, by the image processing system in response to the determining that the detected form is included within the set of predefined core forms, an alignment error representative of a defect in an extrinsic calibration of the camera;
wherein the calibration operation is performed in response to the detecting of the alignment error and is configured to correct the defect in the extrinsic calibration of the camera.

12. A system comprising:
a memory storing instructions; and
a processor communicatively coupled to the memory and configured to execute the instructions to:
identify an object depicted in an image captured by a camera;
locate, within the image, a set of calibration points corresponding to features of the object;
perform, based on the set of calibration points, a calibration operation with respect to the camera; and
perform, concurrently with the performing of the calibration operation, an object modeling operation based on the image, the object modeling operation configured to generate model data representative of a volumetric model of the object depicted in the image.

13. The system of claim 12, wherein:
the camera is a video camera;
the image is included along with an additional image in an image sequence captured by the video camera;
the object is an animate object that autonomously changes form such that a first form of the object in the image is distinct from a second form of the object in the additional image;
the generating of the model data representative of the model of the object is further based on the additional image; and
the processor is further configured to execute the instructions to:
locate, within the additional image, an additional set of calibration points corresponding to the features of the object while the object is in the second form, and
perform, based on the additional set of calibration points, an additional calibration operation with respect to the camera.

14. The system of claim 13, wherein:
the animate object is an entire body of a human being, the features of the object including joints of the human being; or
the animate object is a face of a human being, the features of the object including facial features of the human being.

15. The system of claim 12, wherein the calibration operation is an intrinsic calibration operation configured to manage an intrinsic parameter of the camera.

16. The system of claim 12, wherein:
the processor is further configured to execute the instructions to:
identify the object as depicted in an additional image synchronously captured by an additional camera when the camera captures the image, and
locate, within the additional image, an additional set of calibration points corresponding to the features of the object;
the calibration operation is an extrinsic calibration operation configured to manage an extrinsic parameter of the camera;
the performing of the extrinsic calibration operation is further based on the additional set of calibration points; and
the generating of the model data representative of the model of the object is further based on the additional image.

17. The system of claim 12, wherein:
the processor is further configured to execute the instructions to detect, in response to the identifying of the object in the image, a pose of the object; and
the locating of the set of calibration points corresponding to the features of the object is based on the detected pose of the object.

18. The system of claim 17, wherein the detecting of the pose of the object includes detecting a form of the object based on a preestablished dataset that is developed using a machine learning technology and that defines a set of recognized forms for the object.

19. The system of claim 17, wherein:
the processor is further configured to execute the instructions to:
determine that a detected form of the object is included within a set of predefined core forms, and
detect, in response to the determining that the detected form is included within the set of predefined core forms, an alignment error representative of a defect in an extrinsic calibration of the camera; and
the calibration operation is performed in response to the detecting of the alignment error and is configured to correct the defect in the extrinsic calibration of the camera.

20. An image processing system comprising:
a camera configured to capture an image;
an intra-capture calibration system configured to:
identify an object depicted in the image,
locate, within the image, a set of calibration points corresponding to features of the object, and
perform, based on the set of calibration points, a calibration operation with respect to the camera; and
a modeling system configured to perform, concurrently with the performing of the calibration operation, an object modeling operation based on the image, the object modeling operation configured to generate model data representative of a volumetric model of the object depicted in the image.

* * * * *